G. H. BENJAMIN.
METALLURGICAL FURNACE.
APPLICATION FILED AUG. 17, 1911.

1,026,197.

Patented May 14, 1912.

2 SHEETS—SHEET 1.

Witnesses:
Helen E. Krebsch
Eli Neill

Inventor
G. H. Benjamin

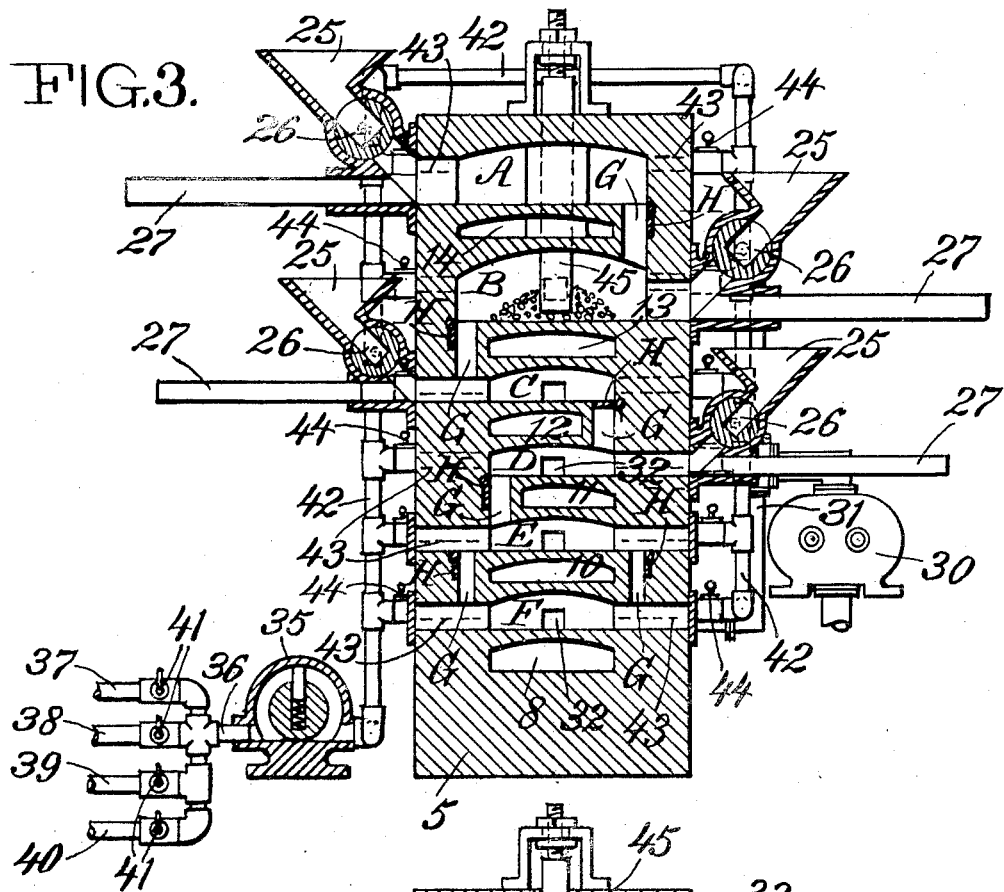

UNITED STATES PATENT OFFICE.

GEORGE HILLARD BENJAMIN, OF NEW YORK, N. Y.

METALLURGICAL FURNACE.

1,026,197.  Specification of Letters Patent.  Patented May 14, 1912.

Application filed August 17, 1911. Serial No. 644,663.

*To all whom it may concern:*

Be it known that I, GEORGE HILLARD BENJAMIN, a citizen of the United States, residing at New York city, in the county and State of New York, have invented certain new and useful Improvements in Metallurgical Furnaces, of which the following is a specification.

My invention more especially relates to improvements in the furnace described in U. S. Letters Patent granted to Robert Hubner of New York, Nos. 899,403, dated September 22nd, 1908, 906,883, dated December 15th, 1908, and 934,532, dated September 21st, 1909.

The features of novelty described in the present application, over those described in the patents above mentioned, consist in: (1) The provision, in a furnace structure, of a chamber and heating means by reason of which the chamber can be raised to a temperature very greatly in excess of that obtainable in the other chambers of the furnace. (2) The provision of adjustable electrodes, so disposed as to distribute uniformly, the electrical heat created within the electrical heating chamber. (3) The provision of means whereby the material introduced into the electrical heating chamber may be subjected to the action of various gases introduced into said chamber, and separately or simultaneously to the effects produced by exhausting the gases introduced into said chamber or developed in said chamber under the action of the electrical heat, or the combined action of the electrical heat and the introduced gas or gases.

The general purpose of my invention is to construct a furnace within a single structure, wherein chemical metallurgical actions or reactions may be effected.

My improved furnace is especially adaptable for the treatment of metalliferous ores, coke and other bodies which may be subjected to gradually increasing temperatures, and if necessary, to a very high temperature at some time during the period they are under treatment.

The accompanying drawings will serve to illustrate my invention, in which—

Figure 1:
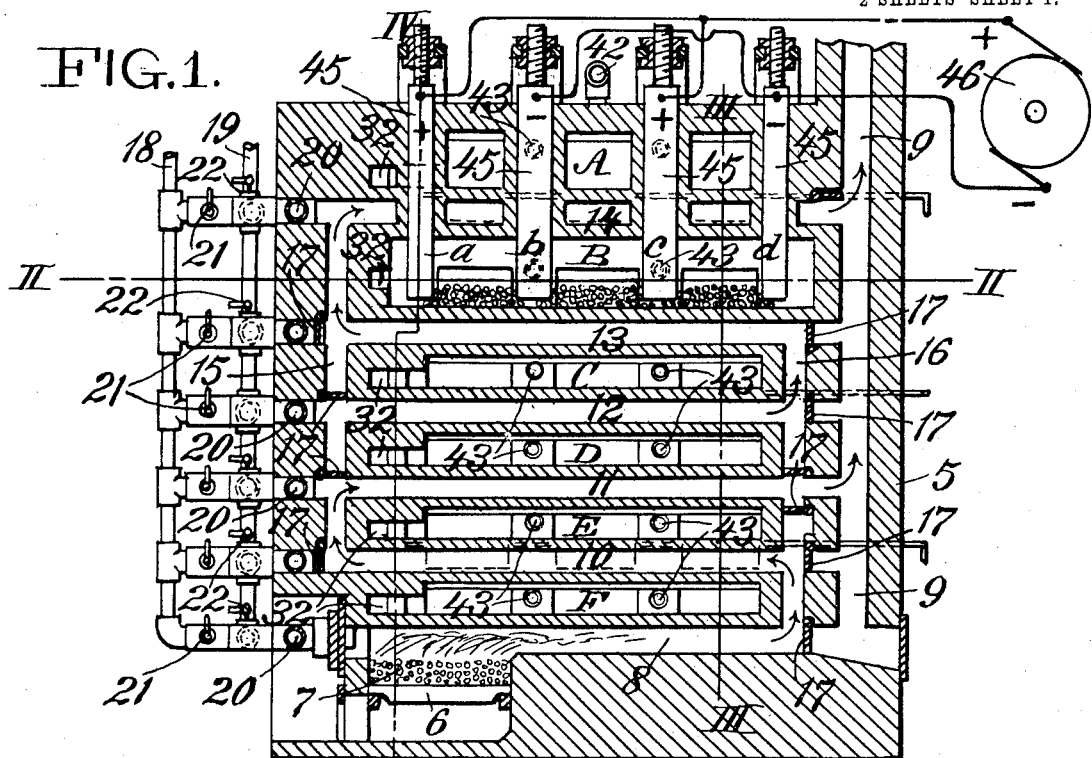
Figure 2:
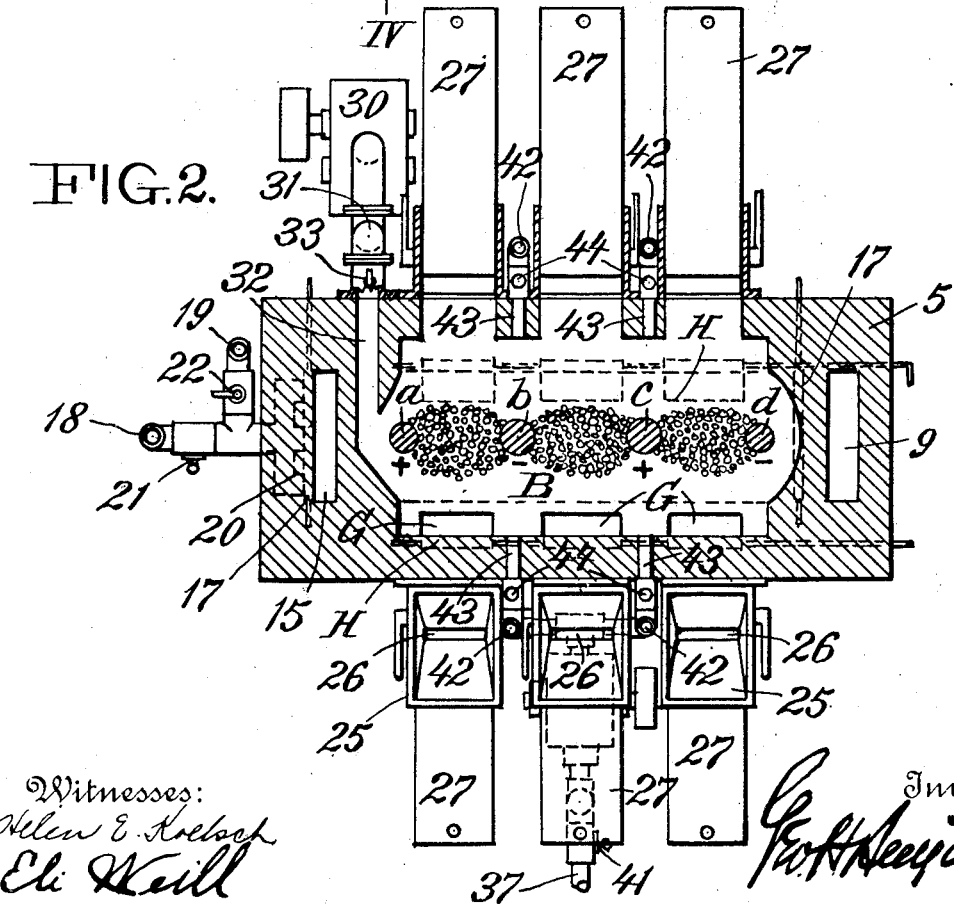

Figure 1 is a vertical longitudinal section. Fig. 2 is a longitudinal section on the line II—II of Fig. 1. Fig. 3 is a vertical transverse section on the line III—III of Fig. 1, and Fig. 4 is a vertical transverse section on the line IV—IV of Fig. 1.

In the drawings, 5 indicates the furnace structure; 6, grate; 7, combustion chamber. The combustion chamber 7 communicates through the horizontal flue 8, directly with the chimney flue 9, and indirectly through the horizontal flues 10, 11, 12, 13, 14 and vertical flues 15, 16, with the chimney flue 9.

Located in the flues are dampers or valves 17, by manipulating which the direction of the hot air current may be regulated. Located at one side of the furnace, are gas and air pipes 18 and 19, through which gas and air in a mingled condition may be fed to the horizontal flues 8, 10, 11, 12, 13, 14, through the instrumentality of burners 20, the ingress of the gas and air being controlled by valves 21, 22. Preferably the gas and air is under pressure. By manipulating the dampers 17, any of the treating chambers A, B, C, D, E, F, may be isolated. The treating chambers are disposed between the heating flues, and connected to each treating chamber alternately on opposite sides of the furnace, are hoppers 25, provided with a rotary valve 26. A pusher, 27, is located under the hopper. Only four hoppers are shown corresponding to four chambers. A hopper, however, may be used in connection with each chamber. The operation of the hoppers and pusher is well understood, and no description is necessary.

Located on one side of the furnace, is an exhaust pump 30, which is connected through its induction orifice to a pipe 31, itself connected through branch pipes 32 to treating chambers A, B, C, D, E, F. Each of the branch pipes 32 is provided with a valve 33, so that the pump 30 may act on any one or all of the chambers as desired.

35 indicates a gas pump, connected through its induction orifice with a pipe 36, from which lead branch pipes 37, 38, 39, 40, to sources of gas which may vary, as for instance, a source of oxygen, hydrogen, chlorin, cyanogen, acetylene, or a source of a pulverized product or bodies, such for instance as carbon, lime, calcium carbid, calcium fluorid, magnesia, or any other body which may be employed to produce chemical reactions alone or in connection with a gas or gases, when brought into contact with the ore in any chamber at any required temperature, or which may coact with the ore when the same is subjected to the high temperature effects in the chamber B. Suitable valves 41 are provided in the branch pipes.

The eduction orifice of the gas pump 35 is connected to a pipe 42 connected by branch pipes 43 to the treating chambers A, B, C, D, E, F. The branch pipes 43 are provided with valves 44.

45 indicates suitable electrodes, adjustable from without the furnace and having their lower ends situated in the treating chamber B. For purposes of description we will name these electrodes as $a$, $b$, $c$, $d$. Electrodes $a$ and $c$ are connected to the plus (+) terminal of the dynamo 46, and $b$ and $d$ to the minus (−) terminal. The electrodes $b$ and $c$ are made larger than $a$ and $d$. It will be observed that the current from the electrodes $a$ and $c$, passes to the electrode $b$, and from $c$ to the electrode $d$. By this arrangement the heat is uniformly diffused throughout the chamber B. Preferably the treating chamber B is made larger than the chambers A, C, D, E, F, the object of which arrangement is to prevent destructive action of the high temperature upon the walls of the furnace, and further, to permit various chemical reactions which will only take place where there is sufficient space to permit free evolution of gas.

The treating chambers A, B, C, D, E, F, are shown as connected through passages G. The passages G are controlled by valves H, which may be opened to permit communication between the chambers, as for instance, between A and B, or to shut off communication, as shown between C and D.

I wish it understood that I do not in any wise limit myself to the particular arrangement of electrodes shown, as other well known arrangements may be employed. Instead of producing the required temperature by contact or through an arc or the utilization of the resistance of the material acted upon, I may produce the required temperature by any well known means. I further wish it understood that I do not limit myself in any wise to the particular arrangement of the treating chambers, and the distribution of the flues, air chambers, valves, heat producing means, exhaust apparatus, or gas and flux feeding apparatus, may be changed without departing from the intent of my invention.

The operation of the furnace will be understood by metallurgists without the necessity of extended description, as it will be understood that to describe all the actions and reactions which can be caused to take place in a furnace having the characteristics disclosed, would be merely to recite well known metallurgical operations.

Generally stated, the operation of the furnace is as follows: Ore is charged by one of the hoppers 25, into the chamber A, pushed in by the pusher 27, and after a time under the action of the pusher, discharged through passage G into chamber B, and so on progressively downward until finally discharged from the furnace through suitable openings provided in the walls; manifestly, instead of charging the ore into the chamber A, it may be charged into any of the chambers, depending upon the initial temperature to which it is desired the ore shall be subjected, it being understood that the temperature of the chambers A, B, C, D, E, F, is normally greater from the top to the bottom of the furnace. This, however, may be altered by varying the gas flames through the burners 20. During the time that the ore is in the treating chambers, or in any one of the treating chambers, the exhaust pump 30 is preferably in operation. The action of the pump is to draw the evolved gases out of the chamber and thus remove any pressure from the ore, thereby permitting free evolution of gas.

If desired, the ore may be subjected to any required temperature without exhausting the gases, the process being an intermittent one, that is, the ore may be submitted to a temperature without exhaustion of the gases, and then to a different temperature with exhaustion of the gases.

In certain metallurgical operations it is desirable to subject the ore under treatment to the action of a very high temperature, such for instance as may be produced within an electric furnace, and at the same time to the action of an introduced gas or flux, or to the action of several gases or fluxes. These gases or fluxes may be introduced through the gas pump 35, at any desired pressure. Manifestly, at the time the gases or fluxes are introduced, exhaustion from the chamber or chambers should be discontinued. Further, it is evident that a series of operations may be conducted in the furnace. In one chamber, for instance, the ores may be treated without the introduction of gases or fluxes and without exhaustion. In the next chamber, treated by high temperature with or without the introduction or exhaustion of gases. In the next chamber, treating and exhausting the gases. In the next chamber, treating, introducing and combining the gases or fluxes, and so on, varying as required, to carry out the metallurgical operations desired.

In practice, it has been found that a plurality of metallurgical operations might be carried on in the furnace at one time. Further, if desired, any two chambers may be brought into coöperation where two metallurgical operations are in progress, the operation in one chamber reacting upon that in the other with beneficial results.

I do not wish to limit myself in any wise to the character of the metallurgical operations which may be carried on. It will be evident to those skilled in the art to which this specification pertains, that a furnace constructed and operated as described, is capable of effecting a great many metallurgical operations and with the greatest economy, and for the reason, that the heat employed in one operation (which ordinarily would wastefully be discharged into the atmosphere) will, through the construction described, be utilized in other operations carried on at the same time; and further, that the gas or gases used in one operation, or evolved in such operation, may be utilized in carrying on other operations without loss by contact with the atmosphere, or without loss of heat.

I have described my improved furnace as generally employed in the reduction of ores. It may, with great advantage be employed in the production of distillation products from coal, or in obtaining distillation products where high temperatures are necessary during one step in the process.

In my improved furnace, provision is made for extracting at the time of separation, the product due to the temperature, or for the chemical treatment of the product while in a nascent state, i. e., at the time of separation of the material acted upon, by the introduction of gases or combining bodies.

I wish it understood that I consider, as a part of my invention, the utilization of the evolved gas or gases from any body at any temperature, as also the treatment of such evolved gas or gases, and the treatment of the material from which such gas or gases are obtained.

Having thus described my invention, I claim:

1. A metallurgical furnace, comprising a series of treating chambers, means for charging the material to be treated into said chambers, means for heating said chambers to definite degrees of temperature, means for heating one of said chambers to a relatively much higher degree of temperature than the other chambers, means for separately exhausting said chambers, and means for separately introducing gases or pulverized bodies into said chambers.

2. A metallurgical furnace, comprising a series of connected treating chambers, a series of valves for separating said chambers, means for charging the material to be treated into said chambers, means for separately heating certain of said chambers to different degrees of temperature, means for heating one of said chambers relatively to a much higher degree of temperature than the other chambers, means for separately exhausting said chambers, and means for separately introducing gases or pulverized bodies into said chambers.

3. A metallurgical furnace, comprising within a single structure, a series of treating chambers, a series of independent means for introducing the material to be treated into the separate chambers, a series of communicating passages between said chambers, valves in said chambers, a series of separately controlled heating means for raising the temperature of certain of said chambers to different temperatures, a series of electrodes for heating one of said chambers, a source of electricity, a series of separately controlled gas exhausting means, and a series of separately controlled gas or flux introducing means.

4. A metallurgical furnace, comprising a series of horizontally disposed treating chambers, a series of horizontally disposed heating flues, said chambers and flues alternately arranged, means for heating certain of the chambers to the maximum temperature of a gas and air flame, means for heating one of said chambers to the maximum temperature obtained by the passage of electricity between the electrodes and an interposed resistant body.

5. A metallurgical furnace, comprising a series of horizontally disposed treating chambers, a series of horizontally disposed heating flues, said chambers and flues alternately arranged, means for heating certain of the chambers to the maximum temperature of a gas and air flame, means for heating one of said chambers to the maximum temperature obtained by the passage of electricity between the electrodes and an interposed resistant body, means for exhausting the air from said chambers, and means for introducing gases or fluxes into said chambers.

6. The herein described process of operating a metallurgical furnace, which consists in charging the material to be treated into a chamber located at the top of the furnace, subjecting it to a definite temperature for a definite time, moving the material into a chamber located at a lower plane, subjecting it to a definite but relatively much higher temperature for a definite time, exhausting the evolved gases, moving the material treated into a chamber located on a lower plane, subjecting it to a definite temperature for a definite time, exhausting the evolved gases, and introducing a gas or flux which will combine with the material treated at the temperature of the second named chamber.

7. The herein described process of operating a metallurgical furnace, which consists in charging the material to be treated into a chamber having a definite temperature, then moving the material into a chamber having the temperature which may be obtained from the passage of an electric current between electrodes and an interposed resistant body, progressively feeding said material into successive chambers heated to temperatures above that of the first named chamber, exhausting the evolved gases in some one or all of said chambers, and subjecting the material to the action of an introduced gas or flux in such chamber or chambers where the temperature conditions are such that the desired chemical combination will be effected.

In testimony whereof, I affix my signature, in the presence of two witnesses.

GEORGE HILLARD BENJAMIN.

Witnesses:
HELEN E. KOLLSCH,
ERNEST D. CONDIT.